United States Patent
Giammaria (10) Patent No.: US 6,526,447 B1
(45) Date of Patent: Feb. 25, 2003

(54) APPARATUS FOR RESTARTING INTERRUPTED DATA TRANSFER AND METHOD THEREFOR

(75) Inventor: Alberto Giammaria, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/460,853

(22) Filed: Dec. 14, 1999

(51) Int. Cl.[7] ............................................. G06F 11/30
(52) U.S. Cl. ...................... 709/232; 709/230; 709/224; 711/135
(58) Field of Search ................................ 709/232, 224, 709/200, 230; 711/135

(56) References Cited

U.S. PATENT DOCUMENTS 5,737,514 A * 4/1998 Stiffler ........................ 714/13
5,845,326 A * 12/1998 Hirayama et al. ........... 711/135
6,253,212 B1 * 6/2001 Loaiza et al. ................ 707/202
6,418,515 B1 * 7/2002 Kurosawa .................... 711/135

* cited by examiner

Primary Examiner—Kenneth R. Coulter
(74) Attorney, Agent, or Firm—Barry S. Newberger; Winstead Sechrest & Minick P.C.; Leslie A. Van Leeuwen (57) ABSTRACT

A method and apparatus are implemented which allow applications to automatically resume from the last checkpoint on the receiver when a distribution interruption has occurred due, for example, to a network failure, machine reboot or power failure. For each repeater and endpoint the amount of data that must be received between two checkpoints may be preselected. Receivers flush the file buffers to nonvolatile storage when a checkpoint corresponding to an end of a data segment being transferred is reached. If a transmission is interrupted, the transfer is resumed from a beginning of the data segment being sent when the interruption occurred.

21 Claims, 5 Drawing Sheets

APPARATUS FOR RESTARTING INTERRUPTED DATA TRANSFER AND METHOD THEREFOR

CROSS-REFERENCE TO RELATED APPLICATIONS

Related subject matter may be found in the following commonly assigned, co-pending U.S. Patent Applications, both of which are hereby incorporated by reference herein:

Ser. No. 09/438,437, entitled "APPARATUS FOR DISTRIBUTING AND COLLECTING BULK DATA BETWEEN A LARGE NUMBER OF MACHINES;

Ser. No. 09/460,855, entitled "APPARATUS FOR DATA DEPOTING AND METHOD THEREFOR";

Ser. No. 09/438,436, entitled "AN APPARATUS FOR CONNECTION MANAGEMENT AND METHOD THEREFOR;

Ser. No. 09/458,268, entitled "COMPUTER NETWORK CONTROL SYSTEMS AND METHODS";

Ser. No. 09/460,852, entitled "METHODS OF DISTRIBUTING DATA IN A COMPUTER NETWORK AND SYSTEMS USING THE SAME"; Ser. No. 09/458,269, entitled "SYSTEMS AND METHODS FOR REAL TIME PROGRESS MONITORING IN A COMPUTER NETWORK";

Ser. No. 09/460,851, entitled "APPARATUS FOR AUTOMATICALLY GENERATING RESTORE PROCESS DURING SOFTWARE DEPLOYMENT AND METHOD THEREFOR"; and Ser. No. 09/460,854, entitled "AN APPARATUS FOR JOURNALING DURING SOFTWARE DEPLOYMENT AND METHOD THEREFOR".

TECHNICAL FIELD

The present invention relates generally to data processing systems, and in particular, to bulk data distributions within networked data processing systems.

BACKGROUND INFORMATION

As network systems increase in size, the efficiencies in transferring data are becoming more important to the effective use of networking resources. Presently, when data is being transferred through the network, there exists the possibility that an interruption will occur during the transfer. Such an interruption might have a minimal effect on the system as a whole, especially if the data packet being transferred is small. However, if the transfer is a large bulk transfer of data through the network, the interruption could have a great effect on system resources.

This occurs because during a data transfer within a network there is presently no method of recording or maintaining track of the amount of data that has been successfully received by the recipient. Thus, when an interruption occurs during the transfer, the sending machine has no method of knowing what portions of the transfer was received and where to properly restart the transmission once the interruption is cleared. Hence, the sending machine must assume that recipient machine either failed to receive any portion of the transmission, or was unable to store any of the data packet that was being transferred prior to the interruption. Therefore, the source system must restart the data transmission at the beginning. If most of the data transfer was complete prior to the interruption, this might mean repeating a large portion of the data packet transfer that it had previously been successfully received, albeit unrecorded.

As can be seen, if a large bulk data transmission is occurring and is interrupted near the end of the transmission, the sender is effectively sending the transmission twice for the same endpoint user upon recommencing the transmissions. Multiplied over a large network, the inefficiencies due to interruptions to the network can cause significant slow downs to either the transfer or the network itself Hence, a need in the art exists such that upon an interruption to a data transfer, the system automatically resumes from the last data point transmitted, rather than at the beginning of the data packet.

SUMMARY OF THE INVENTION

The aforementioned needs are addressed by the present invention. Accordingly, there is provided, a method of maintaining a consistent record of data portions that are transferred from a sender and received by the endpoint machine. Thus, when a distribution is interrupted due to a network failure, machine reboot, power failure, or the like, the distribution is automatically resumed from the last data portion successfully transferred and stored on the receiver.

After the end checkpoint is reached for the data portion, the receiving system flushes the file buffers associated with the current distribution to a nonvolatile storage medium. For each repeater and endpoint, it is possible to preselect the amount of data transferred between two checkpoints. The interval between checkpoints may be configured in accordance with the type of connection between an endpoint and the network. There may be a tradeoff between the time spent flushing disk buffers versus the time spent receiving data.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention provides an apparatus and method for maintain record of data portions transfer machine to machine. A more detailed description of the implementation of the present invention will subsequently be provided. Prior to that discussion, an environment in which the present invention may be implemented will be described in greater detail.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1:
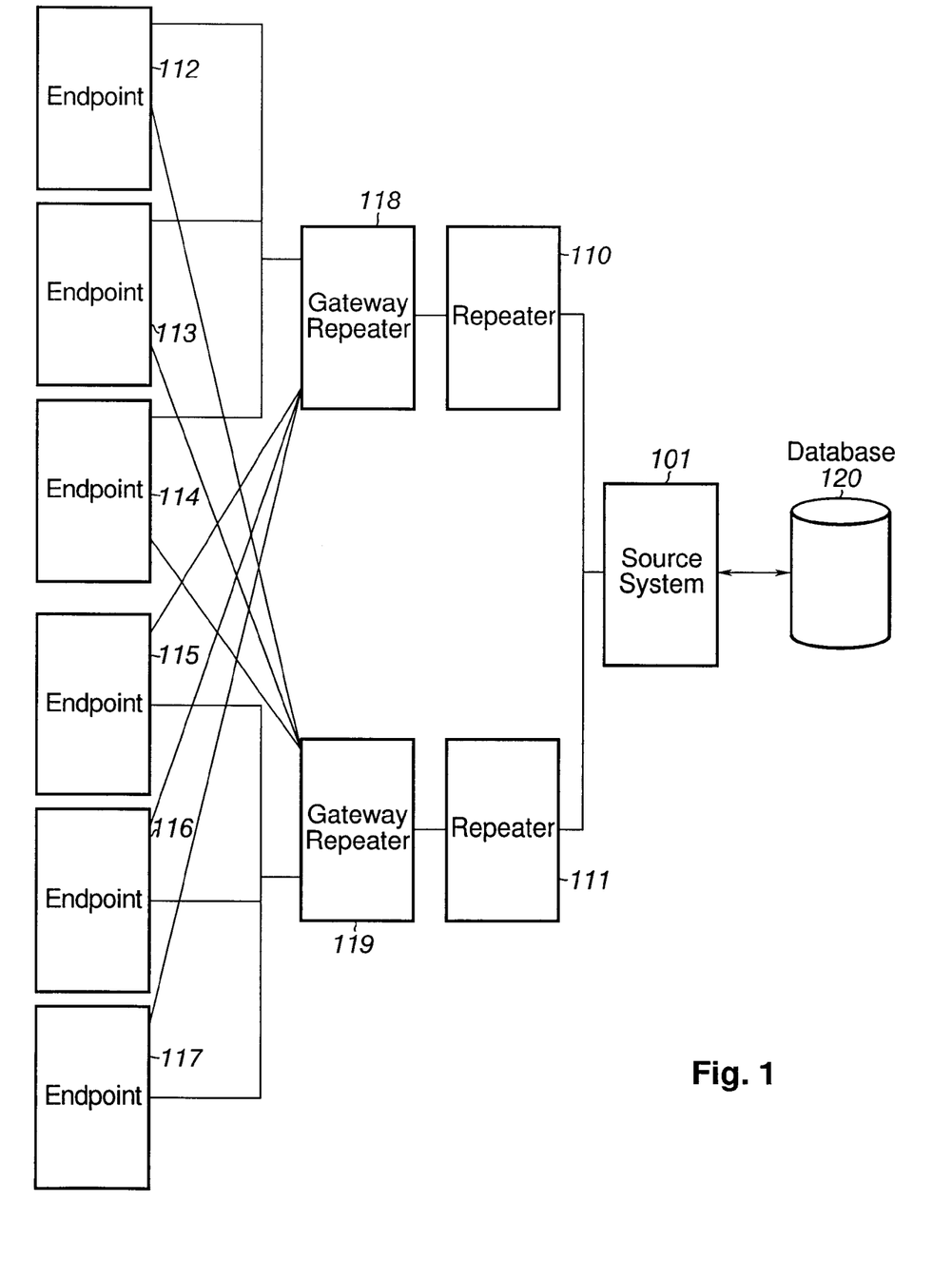
FIG. 1 illustrates, in block diagram form, a data processing network in accordance with an embodiment of the present invention.

FIG. 1 illustrates a communications network 100. The subsequent discussion and description of FIG. 1 are provided to illustrate an exemplary environment used by the present invention. The network system 100 includes source system 101, one or more fan out/collector nodes, or, repeaters 110, 111, 118, 119, and a plurality of endpoints 112–17. Additionally, certain repeaters, such as 118 and 119, are directly connected to one or more endpoints, in the exemplary embodiment of FIG. 1, endpoints 112–114 or 115–117, respectively, and may be referred to as "gateway" repeaters (or, simply, "gateways").

Source system 101 provides distribution services with respect to resources 112–117. Note that source system 101 and endpoints 112–117 interfaces to repeaters 110 and 111 using the same methodologies as repeaters 110 and 111 interface with, for example, repeaters 118 and 119. Viewed logically, source system 110 and endpoints 112–117 each may include a "repeater." In other words, as an artisan of ordinary skill would recognize, a repeater may be a logical element that may be, but is not necessarily associated with a physical, stand-alone hardware device in network 100. Repeater 110 may be the primary repeater through which resources 112–114 receive their data transfers, and repeater 111, likewise, may primarily service endpoints 115–117. The checkpoint restart methodologies described below in conjunction with FIGS. 3–5 may be performed by repeaters 110, 111, 118 and 119. Additionally, these methodologies may also be used by source system 101 and endpoints 112–117. It would be understood by an artisan of ordinary skill that additional repeaters may be inserted into the network and may be arranged in a multi-level hierarchy according to the demands imposed by the network size. Gateway repeaters 118 and 119 are such repeaters in the exemplary embodiment of FIG. 1.

However, network system 100 provides cross connections in order to provide redundant, parallel communication paths should the primary communication path to the endpoint become unavailable. For example, in FIG. 1, endpoint 114 has a primary pathway to source system 101 through repeaters 118 and 110. (A source system, such as source system 101 may also be referred to as a source node.) Should repeater 110 become unavailable, source system 101 can transfer bulk data to endpoint 114 via an alternative pathway through repeaters 118 and 111. Additionally, should repeater 118 become unavailable, endpoint 114 may receive data via repeaters 111 and 119. Source system 101 maintains database 120 for storing information used in managing a data distribution.

Figure 2:
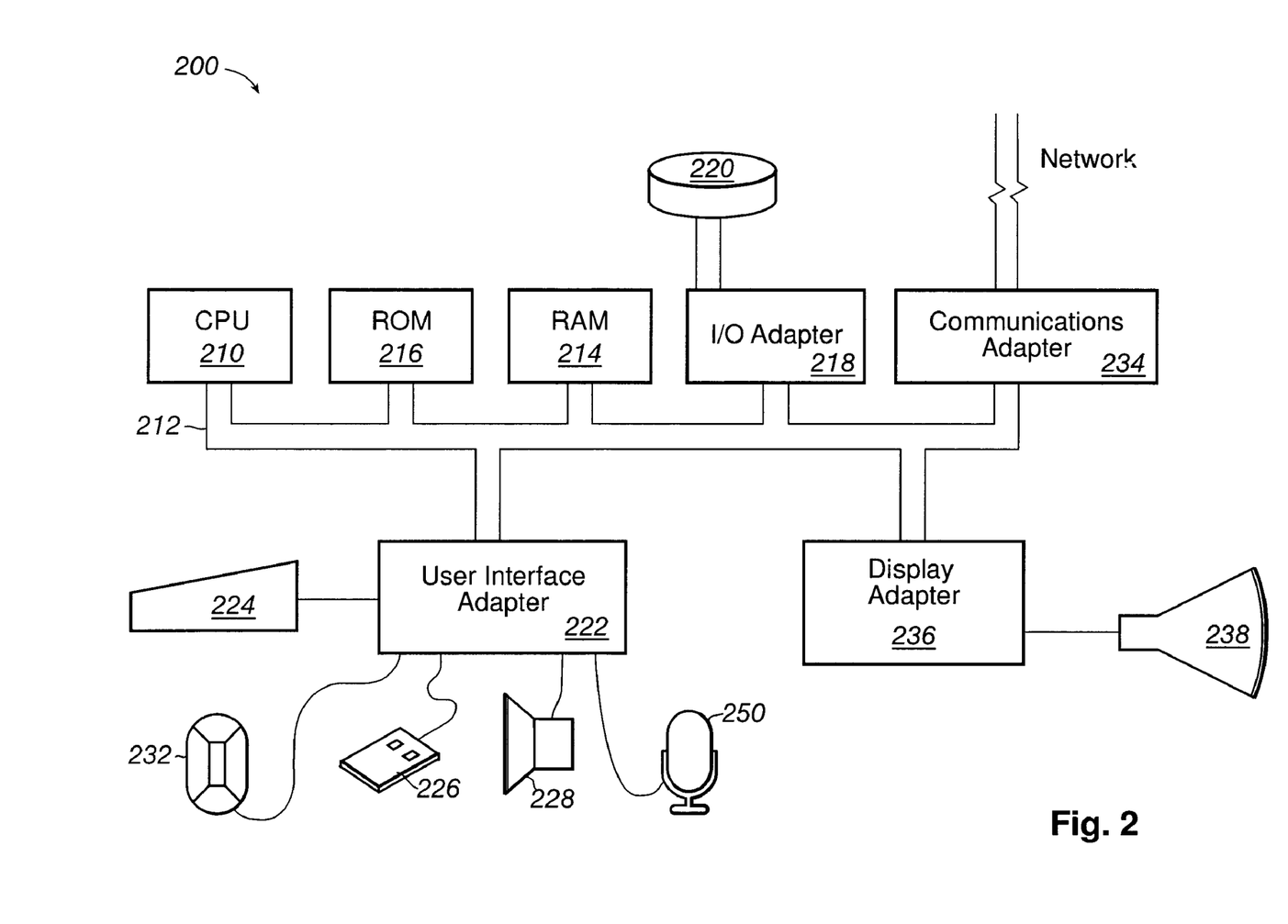
FIG. 2 illustrates, in block diagram form, a data processing system implemented in accordance with an embodiment of the present invention.

Referring next to FIG. 2, an example is shown of a data processing system 200 which may be used to implement a source system such as system 101, repeaters, such as repeaters 110, 111, 118, or 119 or endpoints, such as endpoints 112–117, executing the methodology of the present invention. The system has a central processing unit (CPU) 210, which is coupled to various other components by system bus 212. Read only memory ("ROM") 216 is coupled to the system bus 212 and includes a basic input/output system ("BIOS") that controls certain basic functions of the data processing system 200. Random access memory ("RAM") 214, I/O adapter 218, and communications adapter 234 are also coupled to the system bus 212. I/O adapter 218 may be a small computer system interface ("SCSI") adapter that communicates with a disk storage device 220. Disk storage device 220 may be used to hold database 120, FIG. 1. Communications adapter 234 interconnects bus 212 with the network as well as outside networks enabling the data processing system to communicate with other such systems. Input/Output devices are also connected to system bus 212 via user interface adapter 222 and display adapter 236. Keyboard 224, track ball 232, mouse 226 and speaker 228 are all interconnected to bus 212 via user interface adapter 222. Display monitor 238 is connected to system bus 212 by display adapter 236. In this manner, a user is capable of inputting to the system throughout the keyboard 224, trackball 232 or mouse 226 and receiving output from the system via speaker 228 and display 238.

Referring next to FIG. 2, an example is shown of a data processing system 200 which may be used to implement repeaters, such as repeaters 110 and 111, endpoints, such as endpoints 112–117, servers such as server 101 in the exemplary network 100 of FIG. 1, executing the methodology of the present invention. The system has a central processing unit (CPU) 210, which is coupled to various other components by system bus 212. Read only memory ("ROM") 216 is coupled to the system bus 212 and includes a basic input/output system ("BIOS") that controls certain basic functions of the data processing system 200. Random access memory ("RAM") 214, I/O adapter 218, and communications adapter 234 are also coupled to the system bus 212. I/O adapter 218 may be a small computer system interface ("SCSI") adapter that communicates with a disk storage device 220. Communications adapter 234 interconnects bus 212 with an outside network enabling the data processing system to communicate with other such systems. Input/Output devices are also connected to system bus 212 via user interface adapter 222 and display adapter 236. Keyboard 224, track ball 232, mouse 226 and speaker 228 are all interconnected to bus 212 via user interface adapter 222. Display monitor 238 is connected to system bus 212 by display adapter 236. In this manner, a user is capable of inputting to the system throughout the keyboard 224, trackball 232 or mouse 226 and receiving output from the system via speaker 228 and display 238.

Preferred implementations of the invention include implementations as a computer system programmed to execute the method or methods described herein, and as a computer program product. According to the computer system implementation, sets of instructions for executing the method or methods are resident in the random access memory 214 of one or more computer systems configured generally as described above. Until required by the computer system, the set of instructions may be stored as a computer program product in another computer memory, for example, in disk drive 220 (which may include a removable memory such as an optical disk or floppy disk for eventual use in the disk drive 220). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements. Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Figure 3:
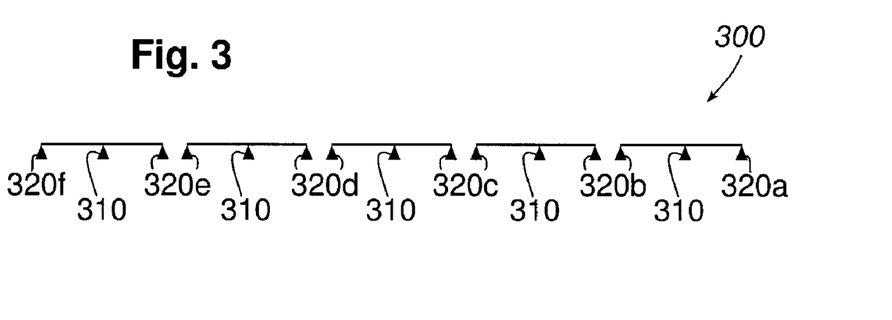
FIG. 3 schematically illustrates a data portion for transfer.

Refer now to FIG. 3 in which is schematically illustrated a data stream being transferred between repeaters or between a repeater and endpoint. A portion of the data stream as represented by 300 may be transferred in a plurality of segments or data portions 310. Each data portion 310 may be logically delimited by checkpoints 320 at either end, which may logically partition data stream 300 into portions, or segments, 310. Each portion 310 between checkpoints may correspond to a preselected number of bytes. Checkpoint 320a may coincide with a beginning of the data stream. Checkpoint 320b may represent the end of a first data portion. Thus, checkpoint 320b may correspond to a preselected byte count wherein the number of bytes between the first and second checkpoint, the data portion size or checkpoint interval, is a preselected number of bytes which is determined in accordance with a set of criteria specified to mitigate against inefficient use of network resources. Although the data transfer between checkpoints has been described in byte units, an artisan of ordinary skill would recognize that other predetermined measures of units of data transmission may also be used in specifying the checkpoint interval, and embodiments implemented in accordance therewith would be within the spirit and scope of the present invention. These criteria may include, for example, the type of network connection such as via a modem or LAN. Thus, a mobile endpoint connected to the network via a modem might dictate a smaller checkpoint size than an endpoint connected via a local area network (LAN) or a repeater connected via a high speed data link. Similarly, checkpoints 320c–320f correspond to the transmission of successive sets of bytes having the preselected checkpoint interval.

The length of the data portion (which maps into a corresponding checkpoint interval) that a particular target receives before flushing its buffer may be configurable by the system operator. There is a tradeoff between data transfer speed, and assured data transfer. A target connected to the sending repeater via a fast network may set a larger checkpoint interval because, in a given time frame, more data will transfer as compared to a target connected by a slow link, a modem, for example. Thus, with comparable interruption rates, assured delivery over a slow link implies smaller checkpoint intervals as compared to a fast network.

Figure 4:
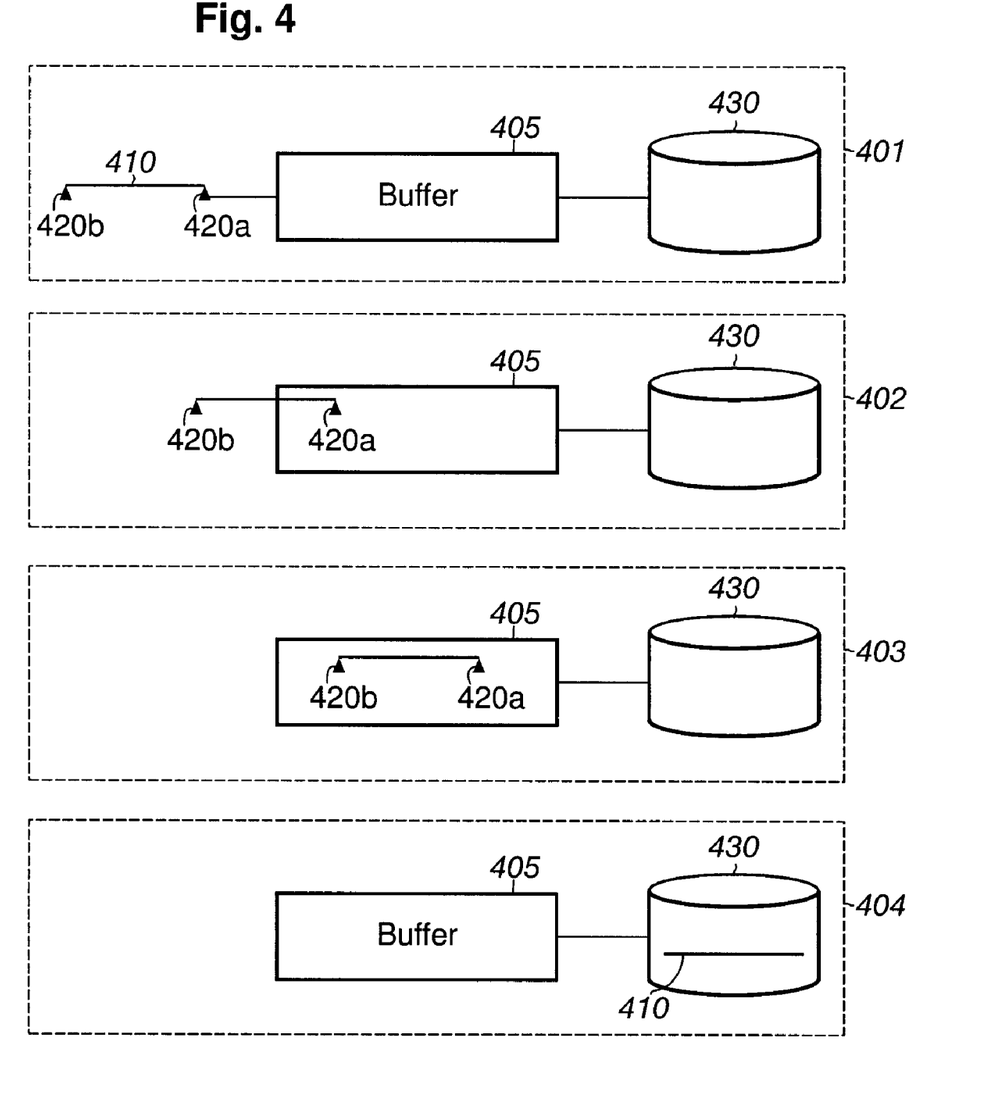
FIG. 4 schematically illustrates a data transfer using checkpoints.

Data transfer using checkpoints may be further understood by referring now to FIG. 4 which is schematically illustrated a data transfer in accordance with the present invention. Block 401 shows a data portion being transferred to a target. The data portion has a beginning checkpoint 420a signaling the start of the data portion 410, and an ending checkpoint 420b, represented by the transfer of a number of bytes corresponding the checkpoint interval. When data arrives, block 402, corresponding to checkpoint 420a at the beginning of a checkpoint interval, in an embodiment of the present invention, a counter may begin counting bytes, or other predetermined measure, of data received.

The target system stores the data between checkpoints within buffer 405. Upon receipt of the entire data portion, as shown in block 403, the counter holds a count corresponding to the checkpoint interval, signaling that checkpoint 420b has been reached, and transfers the data from target system buffer 405 to a nonvolatile storage system 430, block 404. Note that the establishment of a connection for the transfer of data between the sending, or source, and the target system has been described in detail in the co-pending, commonly owned U.S. Patent Application, Ser. No. 09/438,436 entitled "An Apparatus for Connection Management and Method Therefor," and apparatus and methods for transferring data and collecting results information is described in detail in the co-pending, commonly owned U.S. Patent Application Ser. No. 09/438,437, entitled "Apparatus for Distributing and Collecting Bulk Data Between a Large Number of Machines," both of which are incorporated herein by reference.

Figure 5A:
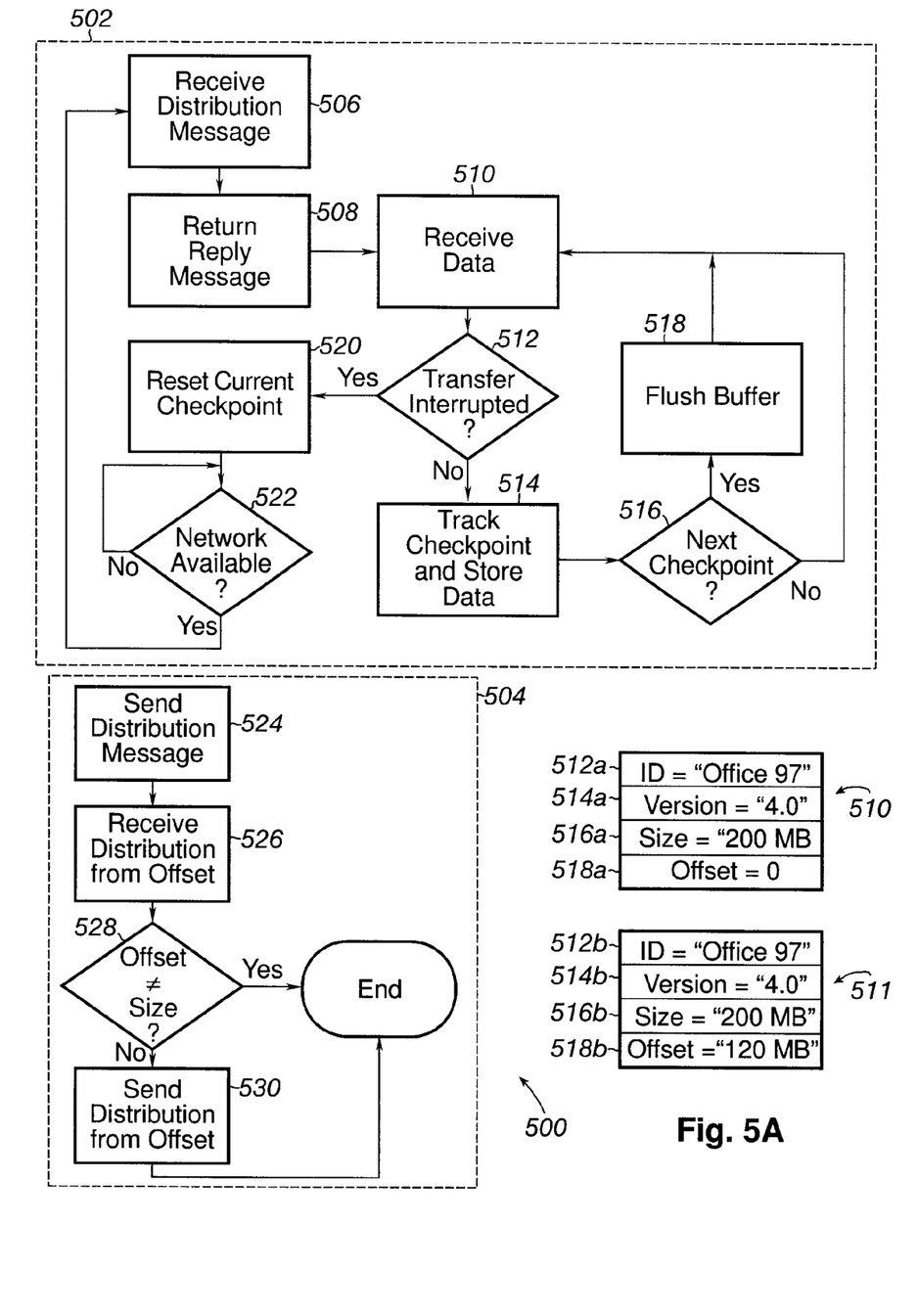
FIGS. 5A and 5B illustrates, in flowchart form, a checkpoint transfer methodology in accordance with an embodiment of the present invention.

Refer now to FIG. 5 illustrating a methodology 500 which may be used for checkpoint data transfer in accordance with the principles of the present invention. Methodology 500 includes two sets of steps, 502 and 504, which may be performed, respectively, by the target system and the sending system, which may be a source repeater or other repeater in the network, such as network 100, FIG. 1. Considering first the set of steps 502, in step 506 the distribution message is received from the repeater sending the distribution. The distribution message may include a control block, a portion 510 of which is shown in FIG. 5A. Portion 510 includes four information fields 512a–518a. Field 512a includes a distribution identifier, an example of which as used in FIG. 510 is "Office 97." Field 514a contains the distribution version, shown in portion 510 as the exemplary version "4.0." In field 516a is the distribution size, shown, by example, as "200 MB." Field 518a includes an offset, the value of which in portion 510 is zero (0). In an embodiment of the present invention, the value of the offset in field 518a in the distribution message sent by the repeater sending the distribution may always be zero. Other information which may be included in a control block that is not specifically germane to the present invention herein has been discussed in the commonly owned co-pending U.S. Patent Application entitled "Apparatus for Data Depoting and Method Therefor," incorporated herein by reference.

In Step 508, a reply message is returned. The reply message includes a portion 511 of a control block, shown in FIG. 5A. Four fields in portion 511, fields 512b–518b are shown. Field 512b includes the distribution ID, again the exemplary value "Office 97" on portion 511. Likewise, Field 514b includes the version of the distribution identified in field 512b, "4.0" in the example herein. Field 516b contains the distribution size, for example, "200 MB" also received in the distribution message in accordance with step 506 and the exemplary entries in portion 510. Field 518b includes an offset value that may be different from zero depending on the state of the distribution at the receiving target. This will be discussed in detail below. In the exemplary values in portion 511, field 518b includes an offset value of "120 MB."

Figure 5B:
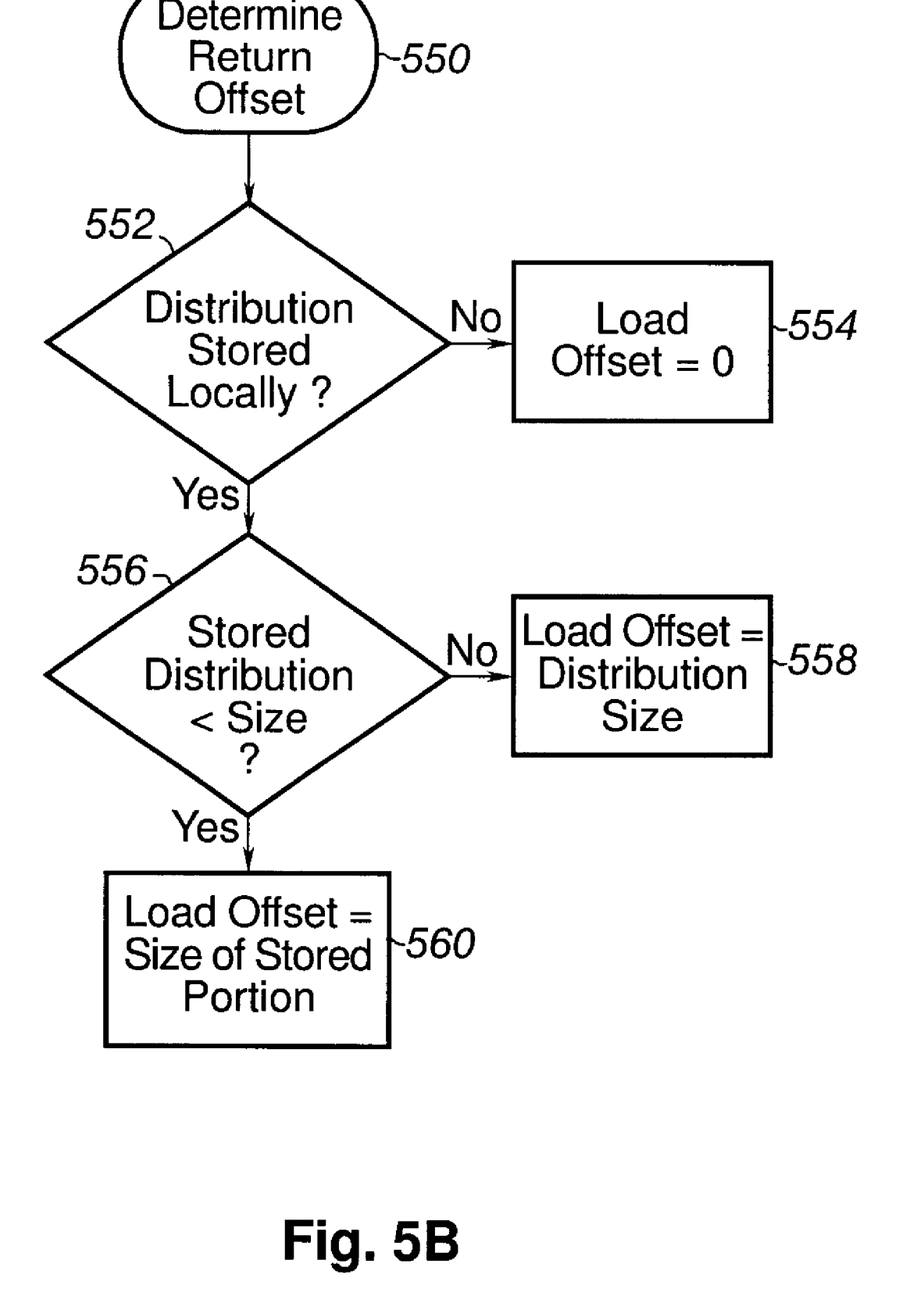

In building the reply message to be returned in step 508, a return value of the offset, in field 518b of data block portion 511 must be determined. Refer now to FIG. 5B illustrating a procedure 550 for determining the return offset.

In step 552 it is determined if the distribution, or a portion thereof, having the identifier and version values loaded in fields 512a and 514a of control block portion 510, FIG. 5A is already locally stored on the target. If not, the value of "0" is loaded in the offset, field 516b of return reply message control block portion 511, step 554.

If, however, in step 552, at least part of the distribution is stored locally, then in step 556 it is determined if the distribution stored locally is smaller than the size value contained in field 516a of control block portion 510, FIG. 5A. If the value is not smaller, in step 558, the offset loaded in field 516b is equal to the distribution size. Otherwise, step 556 proceeds by the "Yes" branch and in step 560 the size of the stored portion is loaded as the offset value in field 518b of data block portion 511, FIG. 5A. The value of the offset in field 518b will be used by the sending repeater to determine the action to be taken as will be described further below in conjunction with the set of steps 504, FIG. 5A.

Returning to FIG. 5A and the discussion of the set of steps 502, in step 510 the distribution data is received. As data is transferred, a distribution may be interrupted due to a network failure, machine reboot, power failure or, in the case of mobile endpoints, for example, a laptop device that may be intermittently connected to the network, an endpoint disconnect. It would be understood by an artisan of ordinary skill, that the aforesaid instances of a transfer interrupt are exemplary, and an interruption of the distribution may occur for other reasons. If, an interruption of the data transfer has not occurred, step 512, in step 514 the received data is stored in a buffer. The buffer, in an embodiment of the present invention, may be a first-in first-out (FIFO) buffer. Additionally, in step 514, the received data is tracked. The received data may be tracked in accordance with the principles of the present invention by incrementing a counter as data values are received and stored in the buffer. In step 516, it is determined if the next checkpoint has been reached. This may be performed in an embodiment of the present invention by determining if the counter value accumulated in accordance with step 514 has reached the value corresponding to the checkpoint interval, discussed hereinabove in conjunction with FIG. 4. If so, in step 518, the buffer is flushed to non-volatile storage. In an embodiment of the present invention in which the buffer is a FIFO, the buffer may be flushed from the "front" of the buffer as incoming data, being received in step 510, is stored in the "back" end of the buffer. Methodology 500 continues to receive data, step 510, as long as the data transfer is not interrupted.

Returning now to step 512, if the transfer is interrupted, in step 520 the current checkpoint is reset. This may be performed in an embodiment of the present invention by resetting the counter tracking the data in accordance with step 514. Methodology 500 then waits, step 522, until the network becomes available, for example, or the mobile endpoint reconnects, and then returns to step 506 to receive the distribution message from the sending repeater as previously described.

The sending repeater performs the set of steps 504 in accordance with the principles of the checkpoint restart mechanism of the present invention. The sending repeater sends, in step 524, the distribution message received by the receiving target as discussed above in conjunction with step 506. The distribution message includes control block portion 510, described hereinabove.

In step 526 the distribution reply is received. The distribution reply includes control block portion 511, the contents of which include the information also described above. In step 528, the offset value in field 518b of control block portion 511 is compared with the size of the distribution as sent in the distribution message, field 516a of control block portion 510. If the offset as received in field 518b of the reply message does not equal the size of the distribution, then, in step 530 the distribution is sent beginning at the offset as received in field 518b. Thus, for example, if the target has not received any portion of the distribution, then as previously described in conjunction with FIG. 5B, the offset returned in field 518b would be zero, and the sending repeater would send the distribution from the beginning. If, however, a portion of the distribution had been stored in non-volatile storage in accordance with the set of steps 502 of methodology 500 then, also as previously described hereinabove in conjunction with FIG. 5B, an offset value between zero and the distribution size would be returned in field 518b of distribution reply control block portion 511. Thus, in step 530, the sending repeater would send the distribution beginning with the portion of the distribution not yet received and stored by the target. If, however, in step 528, the offset received in field 518b of control block portion 511 corresponds to the size value in field 518a of control block portion 510, then the sending repeater determines that the target has received the entire distribution, and there is nothing remaining to be sent, and step 530 is bypassed.

In this way, in the event of an interruption in the transfer of data, the source repeater need only restart the data transfer that the data value corresponding to the current checkpoint for which the data transfer failed. Because the target system commits the received data to an nonvolatile storage after an amount of data corresponding to the checkpoint size has been received, methodology 500 ensures that the target system has the intended data after each checkpoint is reached.

When a data distribution is interrupted due to a network failure, machine re-boot, or power failure, the sending system does not need to restart the transmission from the beginning of the distribution. Instead, the sending system retries with the last successful portion sent. This is particularly useful when distributions are very large.

The foregoing has outlined rather broadly the features and technical advantages of the present invention in order that the detailed description of the invention that follows may be better understood. Additional features and advantages of the invention will be described hereinafter which form the subject of the claims of the invention.

What is claimed is:

1. A method of transferring data comprising the steps of:
   receiving, by a first system, a plurality of data values from a second system;
   storin a subset of said plurality of data values in a first storage device; and
   if a number of said plurality of data values corresponds to a number of data values delimited by a first preselected one of said plurality of data values and a second preselected one of said plurality of data values, flushing a buffer to a second storage device.

2. The method of claim 1 further comprising the step of:
   sending said subset of said plurality of data values wherein a first preselected data value of said plurality of data values is determined in response to a signal from said first system.

3. The method of claim 2 further comprising the step of:
   detecting an interruption in a transfer of said plurality of data values; and
   repeating said step of sending said plurality of data values, said step of repeating said sending beginning with said first preselected one of said plurality of data values.

4. The method of claim 3 wherein said step of repeating said step of sending said plurality of data values includes the step of receiving an offset value in said signal from said first system, said offset value operable for determining said first preselected one of said plurality of data values.

5. The method of claim 1 further comprising the step of incrementing a counter in response to receiving each data value of said subset of said plurality of data values, wherein said buffer is flushed to said second storage device in response to a count in said counter corresponding to said number of data values delimited by said first preselected one of said plurality of data values and said second preselected one of said plurality of data values.

6. The method of claim 5 further comprising the step of resetting said counter in response to an interruption of a transfer of said plurality of data values.

7. The method of claim 4 further comprising the step of determining said offset value in response to a number of data values of said plurality of data values stored in said second storage device.

8. A data processing system comprising:
   circuitry operable for receiving, by a first system, a plurality of data values from a second system;
   circuitry operable for storing a subset of said plurality of data values in a first storage device; and
   circuitry operable for, if a number of said plurality of data values corresponds to a number of data values delimited by a first preselected one of said plurality of data values and a second preselected one of said plurality of data values, flushing said a buffer to a second storage device.

9. The data processing system of claim 8 further comprising:
   circuitry operable for sending said subset of said plurality of data values wherein a first preselected data value of said plurality of data values is determined in response to a signal from said first system.

10. The data processing system of claim 9 further comprising:
    circuitry operable for detecting an interruption in a transfer of said plurality of data values; and
    circuitry operable for repeating said step of sending said plurality of data values, said step of repeating said sending beginning with said first preselected one of said plurality of data values.

11. The data processing system of claim 10 wherein said circuitry operable for repeating said step of sending said plurality of data values includes circuitry operable for receiving an offset value in said signal from said first system, said offset value operable for determining said first preselected one of said plurality of data values.

12. The data processing system of claim 8 further comprising circuitry operable for incrementing a counter in response to receiving each data value of said subset of said plurality of data values, wherein said buffer is flushed to said second storage device in response to a count in said counter corresponding to said number of data values delimited by said first preselected one of said plurality of data values and said second preselected one of said plurality of data values.

13. The data processing system of claim 12 further comprising circuitry operable for resetting said counter in response to an interruption of a transfer of said plurality of data values.

14. The data processing system of claim 11 further comprising circuitry operable for determining said offset value in response to a number of data values of said plurality of data values stored in said second storage device.

15. A computer program product embodied in a machine readable storage medium including programming for transferring data, the programming comprising instructions for:
    receiving, by a first system, a plurality of data values from a second system;
    storing a subset of said plurality of data values in a first storage device; and
    if a number of said plurality of data values corresponds to a number of data values delimited by a first preselected one of said plurality of data values and a second preselected one of said plurality of data values, flushing a buffer to a second storage device.

16. The program product of claim 15 further comprising instructions for: sending said subset of said plurality of data values wherein a first preselected data value of said plurality of data values is determined in response to a signal from said first system.

17. The program product claim 16 further comprising instructions for:
    detecting an interruption in a transfer of said plurality of data values; and
    repeating said step of sending said plurality of data values, said step of repeating said sending beginning with said first preselected one of said plurality of data values.

18. The program product of claim 17 wherein said instructions for repeating said step of sending said plurality of data values includes the step of receiving an offset value in said signal from said first system, said offset value operable for determining said first preselected one of said plurality of data values.

19. The program product of claim 15 further comprising instructions for incrementing a counter in response to receiving each data value of said subset of said plurality of data values, wherein said buffer is flushed to said second storage device in response to a count in said counter corresponding to said number of data values delimited by said first preselected one of said plurality of data values and said second preselected one of said plurality of data values.

20. The program product of claim 19 further comprising instructions for resetting said counter in response to an interruption of a transfer of said first plurality of data values.

21. The program product of claim 18 further comprising instructions for determining said offset value in response to a number of data values of said plurality of data values stored in said second storage device.

* * * * *